US006455455B1

United States Patent
Deller et al.

(10) Patent No.: US 6,455,455 B1
(45) Date of Patent: Sep. 24, 2002

(54) SILICON-ALUMINUM MIXED OXIDE

(75) Inventors: Klaus Deller, Hainburg; Rainer Golchert, Darmstadt; Dieter Kerner, Hanau; Helmut Mangold, Rodenbach, all of (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/560,190

(22) Filed: Apr. 28, 2000

Related U.S. Application Data

(60) Provisional application No. 60/142,781, filed on Jul. 8, 1999.

(30) Foreign Application Priority Data

Apr. 30, 1999 (DE) .......................................... 199 19 635

(51) Int. Cl.[7] .......................... C04B 35/10; C04B 35/18; C04B 35/44
(52) U.S. Cl. .................... 501/153; 501/128; 423/327.2; 423/336
(58) Field of Search ................................ 501/133, 128; 423/327.1, 327.2, 336

(56) References Cited

U.S. PATENT DOCUMENTS

| | | | |
|---|---|---|---|
| 3,130,008 A | * | 4/1964 | Stokes et al. |
| 4,960,738 A | | 10/1990 | Hori et al. .................. 501/128 |
| 5,061,474 A | * | 10/1991 | Pauli et al. |
| 5,380,687 A | * | 1/1995 | Mangold et al. |
| 5,384,306 A | | 1/1995 | König et al. ................. 501/152 |
| 5,424,258 A | * | 6/1995 | Mangold et al. |
| 5,432,137 A | * | 7/1995 | Nishihara et al. |
| 6,197,469 B1 | * | 3/2001 | Kerner et al. |

FOREIGN PATENT DOCUMENTS

| | | |
|---|---|---|
| EP | 0023588 | 2/1981 |
| EP | 0554908 | 8/1993 |
| EP | 0585544 | 3/1994 |

* cited by examiner

*Primary Examiner*—M. Alexandra Elve
*Assistant Examiner*—Colleen P. Cooke
(74) *Attorney, Agent, or Firm*—Smith, Gambrell & Russell, LLP

(57) ABSTRACT

A silicon-aluminum mixed oxide produced by flame hydrolysis and having a composition of from 1 to 99.999 wt. % $Al_2O_3$, the remainder being $SiO_2$, which mixed oxide exhibits an amorphous structure in the X-ray diffraction pattern and consists of intergrown primary particles, and in these primary particles crystallites are present. These crystallites having sizes of between one and 200 namometers and the specific surface of the powder being between 5 and 300 $m^2/g$. These products are produced by a process wherein silicon halide and aluminum halide are vaporized in a particular ratio to one another and are homogeneously mixed with air, oxygen and hydrogen in a mixing unit by means of any carrier gas, this mixture undergoes combustion in a burner of known construction and, after the separation of the solids from the vapour phase, any traces of halide possibly adhering to the product are separated off in a further processing step by means of moist air at elevated temperature. The silicon-aluminum mixed oxide produced by flame hydrolysis are used in the form of dispersions for polishing, in particular in the electronics industry (CMP).

7 Claims, 2 Drawing Sheets

SILICON-ALUMINUM MIXED OXIDE

REFERENCE TO A RELATED CASE

This application claims the benefit of our prior filed Provisional Application 60/142,781 of Jul. 8, 1999 which is relied on and incorporated herein by reference.

INTRODUCTION AND BACKGROUND

This invention relates to a silicon-aluminum mixed oxide, a process for the production thereof as well as the use as a polishing agent in dispersions which are used, for example, for polishing electronic components, in particular for CMP applications.

The patent specification EP-0 585 544 discloses pulverulent silicon-aluminum mixed oxides produced by flame hydrolysis which are of amorphous structure and have a composition of from 65 to 72.1 wt. % $Al_2O_3$ and from 27.9 to 35 wt. % $SiO_2$ and a BET surface area of between 20 and 200 $m^2/g$

SUMMARY OF THE INVENTION

The invention provides a silicon-aluminum mixed oxide powder produced by flame hydrolysis and having a composition of from 1 to 99.999 wt. % $Al_2O_3$, preferably 40 to 80 wt. % $Al_2O_3$, the remainder being $SiO_2$, wherein the powder exhibits an amorphous structure in the X-ray diffraction pattern and consists of intergrown primary particles, and in these primary particles crystallites are present, and these crystallites have sizes of one to 200 namometers and the specific surface area of the powder is 5 to 300 $m^2/g$, preferably 50 to 150 $m^2/g$.

The invention also provides a process for the production of the silicon-aluminum oxide powder produced by flame hydrolysis according to the invention, wherein silicon halide and aluminum halide are vaporized in a particular ratio to one another and are homogeneously mixed with air, oxygen and hydrogen in a mixing unit by means of a carrier gas. This mixture then undergoes combustion in a burner of known construction. After the separation of the solids from the vapour phase, any traces of halide possibly adhering to the product are separated off in a further processing step by means of moist air at elevated temperature.

It has now been found that silicon-aluminum mixed oxides according to the invention which are made into a dispersion exhibit outstanding properties as polishing agents.

These dispersions can be used in particular for polishing in the electronics industry (CMP).

BRIEF DESCRIPTION OF DRAWINGS

The present invention will be further understood with reference to the accompanying drawings, wherein.

DETAILED DESCRIPTION OF INVENTION

Figure 1:
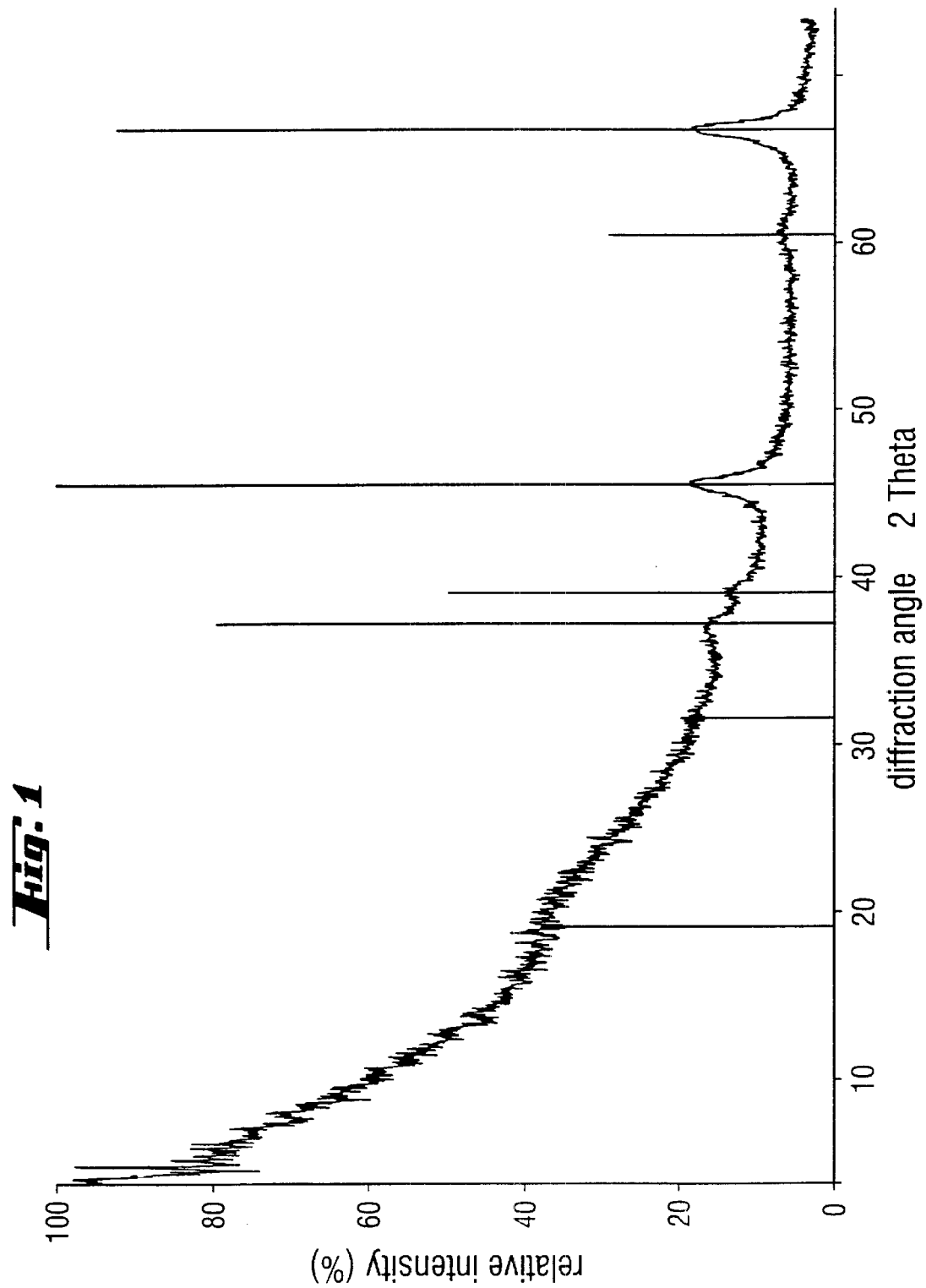
FIG. 1 is an x-ray diffraction pattern of the powder according to the invention.

The silicon-aluminum mixed oxide according to the invention can also be used as filler, as supporting material, as a catalytically active substance, as ceramic raw material, in the electronics industry, as filler for polymers, as starting material for the production of glass or glass coatings or glass fibres, as auxiliary separating agents, in the cosmetics industry, as absorbent material, as an additive in the silicone and rubber industry, for adjusting the rheology of liquid systems, for heat-protective stabilisation, as heat-insulating material, as flow-control agents, in the dental industry, as auxiliary agents in the pharmaceutical industry, in the paint industry, in PET-film applications, in fluorescent tubes, as starting material for the production of filter ceramics or filters, in powders for toners, as rust inhibitors, as agents for the film-coating of polyethylene (PET) and polyvinyl acetate, in inks and in battery separators.

The following examples illustrate the present invention.

Corresponding to the known burner arrangement described in Example 1 of EP-0 585 544, which document is relied on and incorporated herein by reference, the following quantities are specified for the production of the mixed oxide.

EXAMPLE 1

1.6 $Nm^3/h$ hydrogen from the burner or from the reaction together with 5 $Nm^3/h$ air and 1.70 kg/h of previously vaporized $SiCl_4$ are mixed together. Into this mixture, which is at a temperature of about 200° C., is fed in addition 2.5 kg/h gaseous $AlCl_3$ (which has previously been vaporized at about 300° C.). This mixture undergoes combustion in a flame tube, while in addition 12 $Nm^3/h$ air is fed into this flame tube.

After the material has passed through the flame tube, the resulting powder is separated, in a filter or cyclone, from the gases containing hydrochloric acid, and adhering traces of hydrochloric acid are separated from the resulting mixed oxide by treatment at elevated temperature.

The analytical data for the mixed oxide is as follows:

Specific BET surface area 56 $m^2/g$, pH of a 4 per cent dispersion 4.52, bulk density 49 g/l, tamped density 59 g/l. Composition of the powder: 63.6 wt. % $Al_2O_3$, 36.3 wt. % $SiO_2$.

EXAMPLE 2

1.2 $Nm^3/h$ hydrogen from the burner or from the reaction together with 6 $Nm^3/h$ air and 1.70 kg/h of previously vaporized $SiCl_4$ are mixed together. Into this mixture, which is at a temperature of about 200° C., is fed in addition 2.5 kg/h gaseous $AlCl_3$ (which has previously been vaporized at about 300° C.). This mixture undergoes combustion in a flame tube, while in addition 12 $Nm^3/h$ air is fed into this flame tube.

After the material has passed through the flame tube, the resulting powder is separated, in a filter or cyclone, from the gases containing hydrochloric acid, and adhering traces of hydrochloric acid are separated from the resulting mixed oxide by treatment at elevated temperature.

The analytical data for the mixed oxide is as follows:

Specific BET surface area 99 $m^2/g$, pH of a 4 per cent dispersion 3.9, bulk density 39 g/l, tamped density 48 g/l. Composition of the powder: 64.3 wt. % $Al_2O_3$, 35.52 wt. % $SiO_2$.

Additional characterisation of the powders:

The powders have the following special feature: The X-ray diffraction patterns of these powders (see FIG. 1 of Example 1) show that there are virtually no crystalline phases in the powder.

Figure 2:
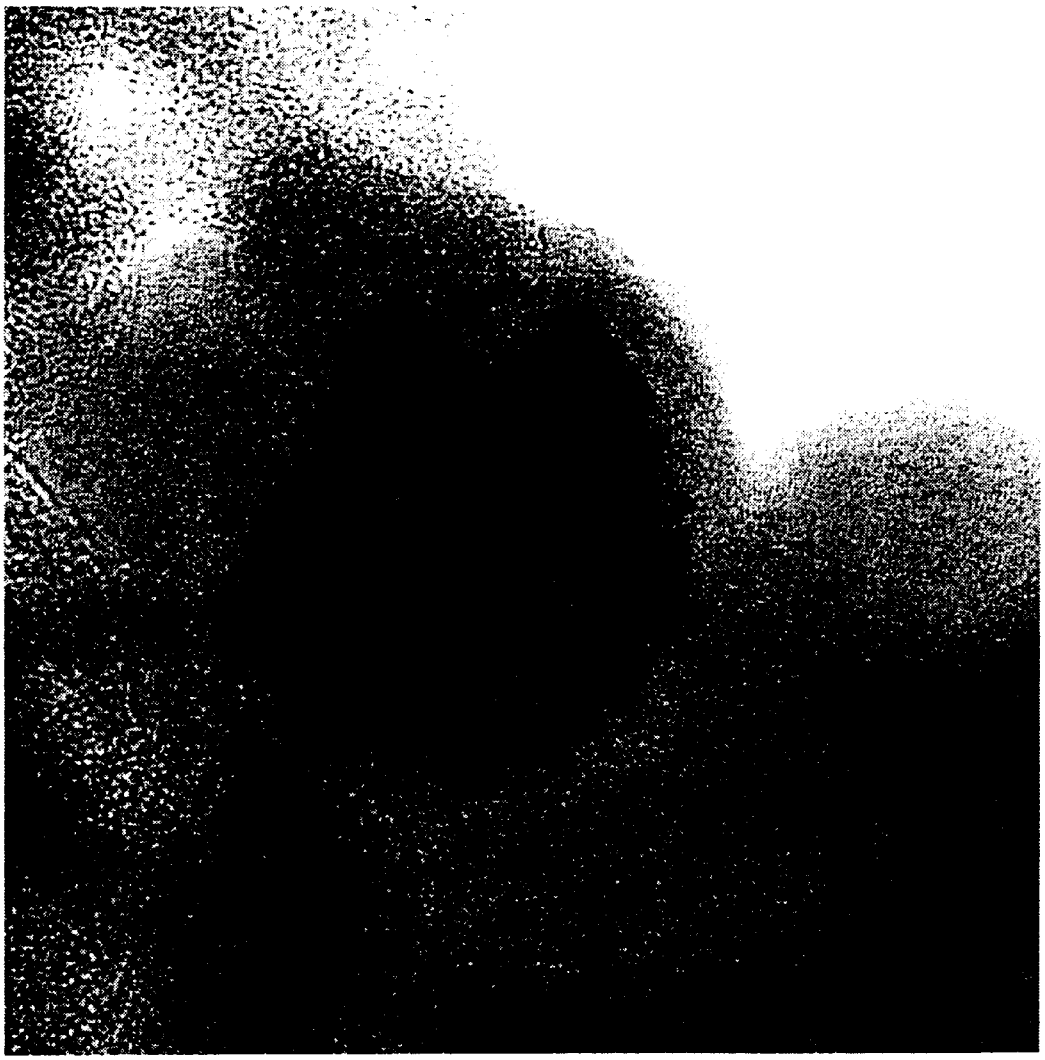
FIG. 2 is a high-resolution electron micrograph of the powders of the invention.

But at the same time a high-resolution electron micrograph shows that the primary particles of the powders contain partially crystalline regions, which are probably responsible for the good polishing performance of the dispersions prepared from these mixed oxides (see FIG. 2).

Further variations and modifications of the foregoing will be apparent to those skilled in the art and are intended to be encompassed by the claims appended hereto.

German priority application 199 19 635.4 is relied on and incorporated herein by reference.

We claim:

1. A silicon-aluminum mixed oxide powder produced by flame hydrolysis and having a composition of from 1 to 99.999 wt. % $Al_2O_3$, the remainder being $SiO_2$, wherein the powder exhibits an amorphous structure in the X-ray diffraction pattern and consists of intergrown primary particles, and in these primary particles crystallites are present, and these crystallites have sizes of one to 200 namometers and the specific surface area of the powder is 5 to 300 $m^2/g$.

2. The silicon-aluminum mixed oxide powder of claim 1 wherein $Al_2O_3$ is present in an amount of 40 to 80 wt %, the remainder being $SiO_2$.

3. The silicon-aluminum mixed oxide powder of claim 1 is wherein the specific surface area is 50 to 150 $m^2/g$.

4. The silicon-aluminum mixed oxide powder of claim 2 wherein the specific surface area is 50 to 150 $m^2/g$.

5. A process for the production of a silicon-aluminum mixed oxide produced by flame hydrolysis as claimed in claim 1, comprising vaporizing silicon halide and aluminum halide in a particular ratio to one another and homogeneously mixing with air, oxygen and hydrogen in a mixing unit by means of a carrier gas, the resulting mixture being combusted, separating solids from vapour phase, and the separating any traces of halide adhering to the product by means of moist air at elevated temperature.

6. An aqueous dispersion of the silicon-aluminum mixed oxide produced by flame hydrolysis as claimed in claim 1.

7. A process for polishing an electronic component comprising applying an aqueous dispersion of the silicon-aluminum mixed oxide of claim 1 and polishing said component to obtain the desired polished component.

* * * * *